Figure 1:
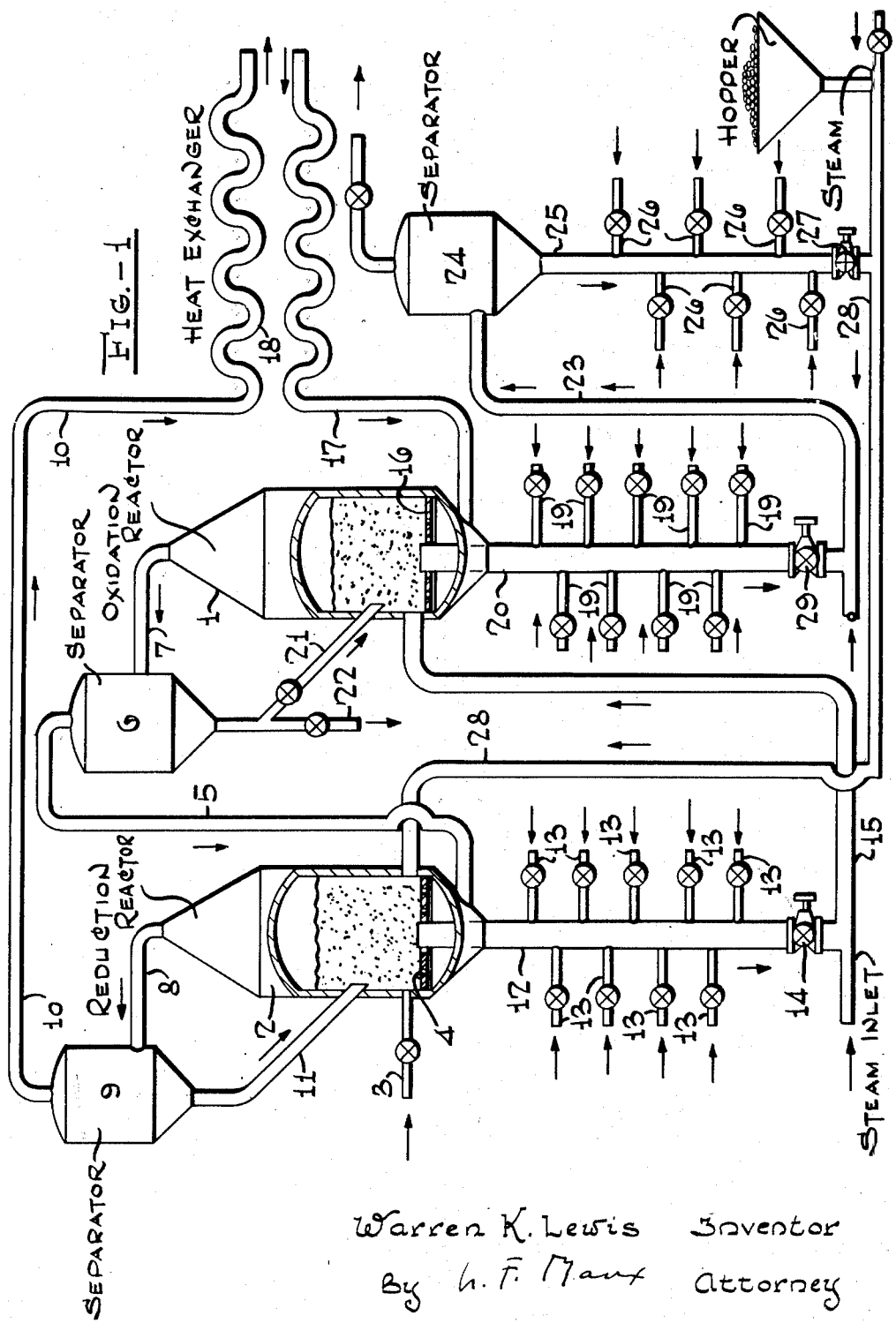

Dec. 30, 1952     W. K. LEWIS     2,623,817
PRODUCTION OF FUEL GASES

Filed April 3, 1946     2 SHEETS—SHEET 2

Warren K. Lewis Inventor
By L. F. Marx Attorney

Patented Dec. 30, 1952

2,623,817

UNITED STATES PATENT OFFICE 2,623,817

PRODUCTION OF FUEL GASES

Warren K. Lewis, Cambridge, Mass., assignor to Standard Oil Development Company, a corporation of Delaware Application April 3, 1946, Serial No. 659,409

14 Claims. (Cl. 48—203)

The present invention is directed to an improved process for the production of useful industrial gases from coal, coke, or similar carbonaceous material by controlled combustion thereof.

In a copending application I have described a method for producing industrial gases, such as producer gas, which is characterized by being performed in two stages, a reduction stage and an oxidation stage, and by feeding the raw material rich in carbon to the reduction stage, passing it from the reduction stage to the oxidation stage, which may be considered a carbon clean-up stage and to which all the air required for the production of the ultimate gas is supplied, and feeding the off gas from the oxidation stage to the reduction stage. This procedure yields a hot producer gas. It is an object of the present invention to provide a similar process in which a relatively cool producer gas is obtained without undue waste of heat.

It might be assumed that in a process of the type just described one could conserve heat by effecting heat exchange between the final hot gas and the cold air fed to the process. This, however, would result in a substantial decrease in the amount of heat which could be absorbed in the oxidation stage and therefore would necessitate a reduction in the carbon feed to the oxidation stage with a consequent loss in capacity in the unit as a whole.

According to the present invention, the desired result is obtained by utilizing an inert heat carrier having high total heat capacity in the process. This heat carrier makes it possible to use preheated air in the oxidation zone without any serious loss in capacity therein. This heated carrier is then conveyed to the reduction zone where it supplies heat for the endothermic reactions occurring therein.

The general principle of the present invention is applicable, also, to processes of a related nature, such as the production of water gas. By the use of this heat carrier it is possible to convert the conventional blow-and-run type of operation for the production of water gas into a continuous run operation.

In order to realize the full advantages of the present invention it is preferred to conduct the operations with all solids maintained in a so-called fluidized condition. The solid carbonaceous material should preferably be of a size such that all particles will pass 10 mesh and a substantial portion will pass 50 mesh. A wide distribution of particle sizes is preferred including particles as fine as 5 microns and ranging upwardly to the maximum size mentioned. The heat carrier, which may be sand or any similar granular or powdery material having a high heat capacity, should likewise be composed of particles all of which pass 10 mesh and which will preferably have a range of particle sizes from about 10 mesh to about 100 mesh. The use of particles of this size range facilitates the separation of ash from the heat carrier. It may be observed that in general the carbonaceous material should contain a greater percentage of fines than in the case where no heat carrier is employed because the carbonaceous fines must assist in the fluidization of the heat carrier. It is important to bear in mind that the percentage of fines actually existing in the reaction zone is usually far greater than that provided in the feed of carbonaceous material due to attrition and degradation resulting from reaction.

Figure 2:
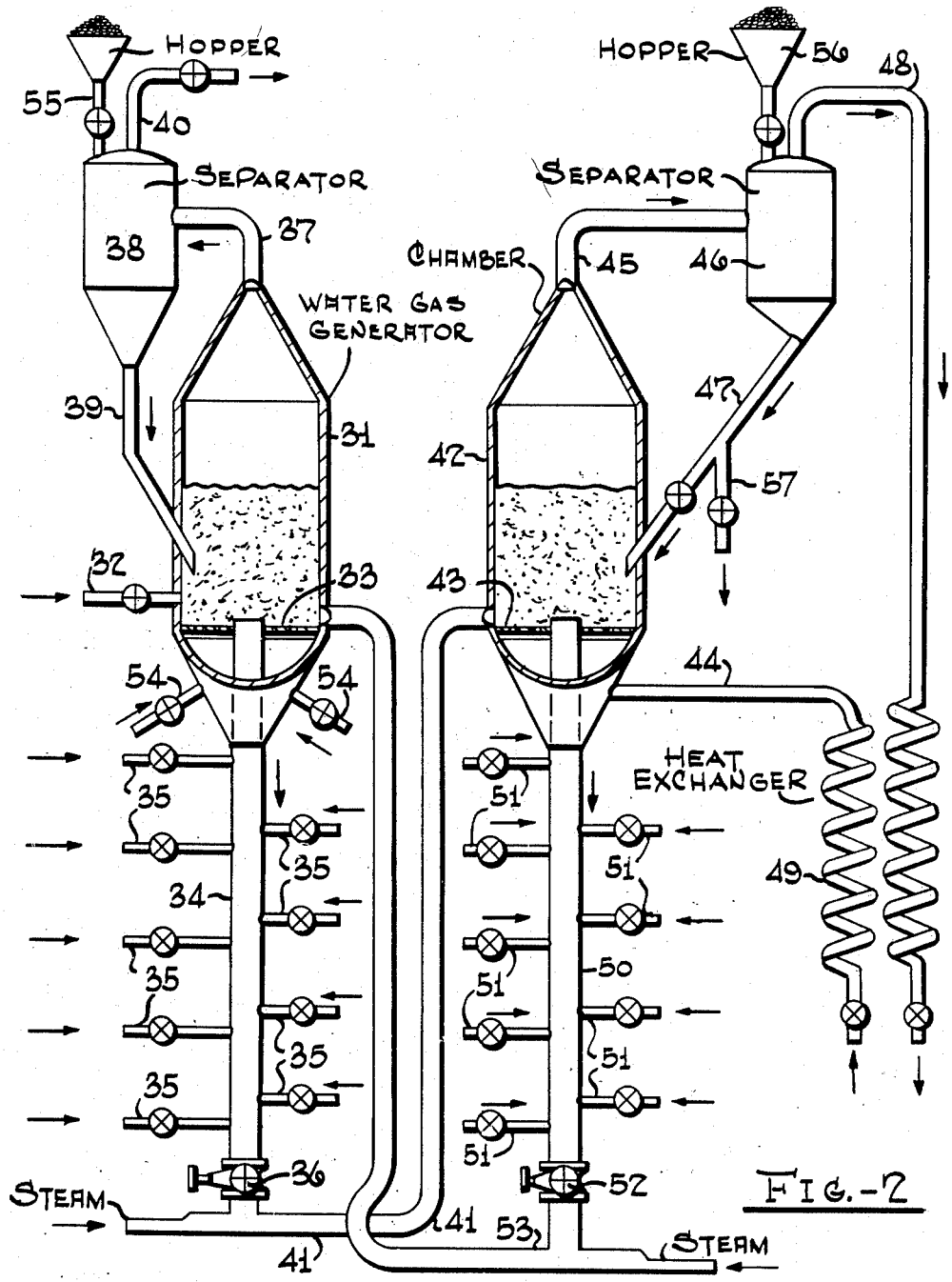

The nature of the present invention may be more clearly understood from the following detailed description of the accompanying drawing in which:

Fig. 1 is a front elevation in diagrammatic form of a plant suitable for the production of cold producer gas according to the present invention; and Fig. 2 is a similar view of a plant suitable for the production of water gas in accordance with the present invention.

Referring to Fig. 1 in detail, numeral 1 designates the first or oxidation reactor and numeral 2 designates the second or reduction reactor. The ground carbonaceous material is introduced into reactor 2 through a feed line 3 at a point just above a suitable grid or grate 4 which is provided with openings of a size sufficient to pass the solid material. The carbonaceous material may be forced in by a screw conveyor or may be fed in in fluidized condition from a standpipe connected to a hopper according to the technique well known in catalytic cracking utilizing a fluidized catalyst.

Gas is introduced into the bottom of reactor 2 by way of line 5 which carries off gas from a cyclone separator, or other separator of gases and solids, 6 which in turn receives a mixture of gas and solids from reactor 1 through line 7.

The gas carried by line 5 is the product of the reaction of oxygen with carbonaceous material in reactor 1, the oxygen being supplied, e. g., in the form of air. It may contain from 5 to 10% of $CO_2$ and 10 to 16% of oxygen, depending on the solid and gas feeds to reactor 1. In some cases both the oxygen content and the $CO_2$ content may be much higher. It is preferred to maintain a substantial amount of oxygen in line 5, however, to assist in providing heat in reactor 2 by reaction with carbon. The gas is introduced through line 5 at a rate sufficient to effect fluidization of the finely divided solid material in reactor 2. Ordinarily the gas velocity through reactor 2 will be between about .5 and 5 feet per second, the particular velocity depending on the particle size and the particle size distribution of the solids in this reactor.

The gas leaving reactor 2 will consist mainly of CO and $H_2$ aside from nitrogen. When ground coal is used, this gas is enriched with hydrocarbons, and this is desirable in fuel gas. In such case this gas may be processed for the recovery therefrom of any such hydrocarbons desired. This gas carrying fine solids is fed by way of line 8 into a cyclone or other separator 9 from which the free gas leaves by line 10 while recovered solids are returned to the reactor through line 11.

The minimum gas velocity in reactor 2 is that sufficient to give the necessary turbulence to achieve the purpose of the invention. As gas velocity is increased above this minimum the tendency is for the solid density in the reactor to be reduced by reason of carryover of solids by the gas. However, if solids are fed into the reactor at a high rate, this reduction in density due to high gas velocity is less. This is made possible by recycling of solids from cyclone separator 9. The maximum gas velocity is that which will maintain satisfactory solids concentration in reactor 2 with recycle of solids from separator 9. This procedure allows high maximum capacity together with a wide range in capacity while still maintaining good operating conditions.

Partly spent carbonaceous material mixed with inert heat carrier leaves the bottom of reactor 2 by way of standpipe 12. This pipe is provided with a plurality of injection ports or nozzles 13 for injection of small amounts of fluidizing gas to maintain the solids in the pipe in fluidized condition. It is convenient to use steam for this purpose.

At the bottom of the standpipe is a control element 14 which may be a suitable slide valve, star wheel, or other device for controlling the flow of a fluidized solid. This solid is discharged into a flow line 15 by which it is conducted to the bottom of reactor 1 where it is introduced above a grid or grate 16. Some steam may be introduced into line 15, as indicated, as well as at the points therealong, to facilitate the transfer of the fluidized solid.

The full requirement of air for the process is introduced into the bottom of reactor 1 below the grid through line 17. Lines 17 and 10 pass through a heat exchanger 18 in which heat is imparted to the incoming air by the final product gas whereby the latter is cooled. The air is introduced into reactor 1 at a rate sufficient to maintain the solids in this reactor in a fluidized condition. Again, the velocity of air through this reactor will, in general, be between about .5 and 5 feet per second. Usually, however, it will be lower than the velocity in reactor 2. This is because the average particle size of the solids fed into reactor 2 becomes smaller by reason of attrition and reaction, and, in addition, fine ash builds up in reactor 1 as will hereinafter appear.

Some steam may be admitted with the air in line 17 to assist in temperature control in reactor 2. Much of this may be brought in by line 15.

Further quantities of steam and/or air will be introduced into the process by way of jets 19 in standpipe 20 into which ash and inert heat carrier from reactor 1 are discharged. This mixture of solids is maintained in dense, fluidized condition in standpipe 20 to prevent plugging and to provide a hydrostatic head to facilitate transfer.

The reaction gas containing ash leaves the top of reactor 1 through line 7 which discharges into separator 6. The ash, which may contain inert heat carrier, is fed back from the separator to reactor 1 by line 21. If this material is predominantly ash, it may be removed from the system at this point through line 22. The fluidized solid mixture is transferred from standpipe 20 by line 23 into a cyclone or other separator 24. A gas, such as air, is forced into line 23 at its open end in order to impart sufficient velocity to the solid stream moving through this line to carry out of the separator 24 the light ash, allowing only the heavier solid material to fall into the standpipe 25 at the bottom of separator 24. This standpipe is also provided with jets or ports 26 into which fluidizing medium may be fed at a rate sufficient to maintain the solid in the standpipe in a dense, fluidized state. A control element or valve 27 is provided at the lower end of the standpipe which discharges into a transfer line 28. Steam may be fed into the open end of this transfer line to assist in the transfer of the hot heat carrier to reactor 2 where it is introduced just above the grid or grate 4. In the transfer of this heat-carrying solid from reactor 1 to reactor 2 any gases which are employed to assist in the transfer are preheated to a temperature at least as high as that of the heat carrier.

In starting this system, one convenient procedure includes the following operations:

1. Hot combustion gas containing oxygen is passed through the system and solid is introduced in order to bring the system to a temperature at least about 1600° F.

2. Sand is introduced rapidly into reactor 1 until this reactor is properly loaded for good fluidized condition throughout the reactor, that is, a density of 5 to 10 pounds per cubic foot.

3. A mixture of equal parts of sand and coke is introduced into reactor 2 in like manner until it is properly loaded for good fluidized operation.

4. As soon as the temperature in reactor 2 starts to rise above that obtaining in line 5, steam is introduced into reactor 2 to hold down the temperature.

5. Valve 14 is opened partially to initiate temperature rise in reactor 1, care being taken that this temperature does not rise above the ash sintering temperature, and at the same time the level in reactor 1 is maintained by suitably adjusting valve 29.

6. Progressively replace the combustion gas by air in line 17.

In the production of water gas it is customary to provide a bed of carbonaceous material which is blown alternately with air and steam. The blowing with air serves the purpose of burning a portion of the carbonaceous material to raise the temperature of the bed to that required for the reaction between steam and carbon. When the bed is sufficiently heated, which in practical operation is in a matter of minutes, the steam is blown through it to effect a reaction between the steam and the carbon in the bed, producing a mixture of carbon monoxide and hydrogen. This reaction is highly endothermic, which means that the bed rapidly cools down resulting in a very short reaction period. Moreover, the rate of this reaction depends upon the carbon concentration in the bed. The more this is depleted by the combustion step the slower is the rate of the reaction with the steam, with the result that a single charge of carbonaceous material to the reactor provides only a limited reaction time.

The present invention makes possible the production of water gas in a continuous process in which an adequate heat supply is continuously maintained and in which the carbonaceous material in the reaction chamber is adequately rich in carbon. The manner in whch this process may be conducted according to the present invention is illustrated in Figure 2 in which numeral 31 designates the water gas generator to which carbonaceous material is fed through line 32 just above a grate or grid 33 in a manner similar to that described with reference to Figure 1. The partially depleted carbonaceous material leaves the reactor through a standpipe 34 connected to the bottom thereof and provided with jets or nozzles 35 for the introduction of steam in quantities sufficient to maintain the solids in the standpipe in dense, fluidized condition. Near its bottom this standpipe is provided with a suitable control element 36 to regulate the amount of solid material leaving the standpipe. The gas leaves the upper end of the reactor through line 37 which discharges into a cyclone or other suitable separator of gases or solids 38 from the bottom of which solids are returned to the reactor through pipe 39 and from the top of which product gas is withdrawn through line 40.

The solids discharged from standpipes 34 are conducted by pipe 41 to a second chamber 42 which may be called a carbon clean-up chamber and which, in addition, serves the function of a heater. Air or steam may be introduced into the open end of pipe 41 to assist in the transfer of the solid material.

The vessel 42 is similar in construction to the reactor 31 being provided with a grid or grate 43 just below the discharge point of pipe 41. Air is introduced below the grid 43 through line 44. The combustion gases leave vessel 42 through line 45 and pass through a cyclone or other separator 46 from the bottom of which solids are drawn off through line 47 while the residual gas goes off overhead through line 48. Lines 44 and 48 pass through a heat exchanger 49 whereby the incoming air is preheated by the combustion gas.

The solid residue is drawn off from the bottom of vessel 42 through standpipe 50 provided with suitable jets or nozzles 51 to maintain the solids in said standpipe in a dense, fluidized condition. Near its bottom the standpipe is provided with a control element 52 to regulate the amount of solids leaving the standpipe. The solids leaving the standpipe feed into line 53 which returns them to reactor 31 at a point just above grid 33 or near the top thereof, or both, as desired. Steam may be introduced into the open end of pipe 53 to assist in this transfer. Where the steam so introduced, together with the steam introduced by nozzles 35 is insufficient to supply all the steam required for the production of water gas, and this is usually the case, additional steam is introduced into the bottom of reactor 31 through suitably arranged feed lines 54.

In this process an inert heat carrier is employed. This heat carrier is a finely divided solid, such as sand or other inert material of high total heat capacity. This heat carrier may be introduced into the system through separators 38 and 46 by way of suitable hoppers 55 and 56, respectively. This inert heat carrier is heated to a high temperature in vessel 42 by the combustion of the residual carbon feed from reactor 31 to vessel 42. In vessel 42 the amount of air supplied should be that sufficient to burn the carbon to carbon dioxide, thereby providing a maximum of heat to be stored in the heat carrier. The velocity of the air through vessel 42 will be suitably adjusted between about .5 and 5 ft./second to maintain the solids therein in a fluidized condition. This velocity is preferably so regulated as to carry off overhead the light ash which is withdrawn from separator 46 by line 47 and may be withdrawn from the system by branch line 57 or returned in part to the vessel 42 to maintain therein a selective ash content. Recycling of sufficient ash with the heat carrier to provide good fluidization in the transfer lines is desirable.

The particle sizes of the carbonaceous material and the inert heat carrier for use in this process are of the same order of magnitude as those recited in connection with Fig. 1. It is preferred to have a large predominance of fines in the carbonaceous material, meaning by fines particles smaller than 100 mesh, in order to insure the fluidization of the inert heat carrier. It may be mentioned, also, that the gas velocity in the reactor will be of the same order of magnitude as that in reactor 2 of Fig. 1.

In starting the system in operation, reactor 31 and vessel 42 may both be charged with a mixture of finely divided carbonaceous material, such as coke, and a finely divided heat carrier, such as sand. The sand content of the charge to vessel 42 may constitute at least ½ thereof while the sand content of the charge to reactor 31 should not constitute more than about ⅓ thereof. At the outset, air may be blown through both vessels until they are brought up to temperature and the flow of solids through the system is regulated to the desired rate. Then the supply of air to reactor 31 may be replaced by steam and the operation continued in an uninterrupted manner from this point with coke being continuously charged through line 32 and ash being continuously withdrawn through pipe 57.

In operation the temperature in vessel 42 is regulated by the supply of carbon thereto by line 41. The composition of the off gas in this vessel is, of course, determined by the rate of air supply thereto. The composition of the water gas is determined by the supply rate of the carbonaceous material and the temperature maintained in reactor 31 which, in turn, is adjusted by the rate of sand supply through line 53.

The temperature in reactor 31 should be maintained at the highest level compatible with maintaining suitable fluidization characteristics of the ash. When using high grade anthracite with high fusion ash as the raw feed, the temperature in reactor 31 may be at least 2000° F. and in reactor 42 2100° or even 2200° F. The reactor 42 places a limitation on the temperature which can be attained in reactor 31 because the temperature in reactor 42 will be higher than that in 31 and it in turn is limited by the fusion point or sintering point of the ash produced from the raw feed. One reason for maintaining as high a temperature as possible in reactor 31 is to make possible the recovery from the coal used as raw feed such hydrogen as may be cracked out of the raw feed.

It will be understood that the foregoing discussion of the specific flow plans illustrated is intended to explain the nature of the present invention and not to define its limits. Various modifications of the particular flow plans described will occur to those skilled in the art and applications of the general principles embodied in the present invention other than those specifically illustrated will be apparent.

The nature and objects of the present invention having been thus described and illustrated, the said invention is defined as follows:

1. A process for preparing a fuel gas from solid carbonaceous material which comprises reacting said carbonaceous material with a gasiform material which reacts endothermically with said carbonaceous material to generate fuel gas rich in CO in a first reaction zone, reacting in a second zone carbonaceous material and a gasiform material which reacts exothermically with said carbonaceous material to form carbon dioxide, passing a moving stream of finely divided inert solids of high heat capacity in a closed cycle including said zones, whereby said inert solids move from one zone to the other in sequence, feeding finely divided fresh carbonaceous material to said first zone in which it mixes with said inert solids, feeding to said first zone off gases from said second zone, at least a portion of said off gases reacting endothermically with said carbonaceous material to form said fuel gas in a manner such as to maintain said carbonaceous material and said inert solids in said zone in a fluidized condition, feeding partially spent carbonaceous material and inert solids from said first zone to said second zone, feeding gasiform material capable of reacting exothermically with said partially spent carbonaceous material to said second zone in a manner such as to maintain the carbonaceous material and inert solids in said second zone in a fluidized condition, said last-named gasiform material being further characterized in that it contains sufficient free oxygen to consume the carbon fed to said zone, maintaining an exothermic reaction producing carbon dioxide in said second zone, withdrawing a mixture of ash and hot inert solids from said second zone separating ash from said hot inert solids and returning at least a portion of said separated hot inert solids to said first zone.

2. The process of claim 1 wherein ash produced by reaction of said gasiform material in said first zone is separated from said inert solid material while in the hot condition resulting from said exothermic reaction and said hot inert solids are returned to said first zone.

3. The process of claim 1 wherein steam is fed to said second zone.

4. A method according to claim 1 in which a hot product gas is taken off said first zone and the heat therein is transferred by indirect heat exchange to the gasiform material fed to said second zone.

5. A method according to claim 1 in which the gasiform material fed to said second zone contains oxygen in excess of that required for the consumption of the carbon fed to said zone, the hot off gas from said second zone is the gasiform material fed to said first zone and contains a substantial quantity of free oxygen, a hot product gas is recovered from said first zone and heat therefrom is transferred by indirect heat exchange to the gasiform material fed to said second zone.

6. The method for preparing a fuel gas from solid carbonaceous material which comprises reacting carbonaceous material with a gasiform material which reacts endothermically with said carbonaceous material in a reaction zone, reacting in a second zone carbonaceous material and a gasiform material which reacts exothermically with said carbonaceous material, said last-named gasiform material being further characterized in that it comprises steam and at least sufficient free oxygen to consume the carbon fed to said zone, passing a moving stream of finely divided inert solids of high heat capacity in a closed cycle including said zones whereby said inert solids move from one zone to the other in sequence, feeding finely divided fresh carbonaceous material to said first zone in which it mixes with said inert solids, feeding to said first zone off gases from said second zone which gases react endothermically with said carbonaceous material in a manner such as to maintain said carbonaceous material and said inert solids in said zone in a fluidized condition, feeding partially spent carbonaceous material and inert solids from said first zone to said second zone, feeding said gasiform material capable of reacting exothermically with said partially spent carbonaceous material to said second zone in a manner such as to maintain the carbonaceous material and said inert solids in said second zone in a fluidized condition in which said carbonaceous material is consumed by reaction with said gasiform material and converted into ash, separating ash from said inert solids while in the hot condition resulting from said exothermic reaction and returning said hot inert solids to said first zone.

7. A method for preparing a fuel gas from solid carbonaceous material which comprises establishing a closed cycle of a moving body of finely divided inert solid material of high heat capacity, maintaining said solid in a turbulent suspended condition throughout its cycle, adding finely divided fresh carbonaceous material to said moving body at one point of its cycle, contacting the mixture with a gasiform material containing carbon dioxide and capable of reacting endothermically with said carbonaceous material at said point under conditions under which they react to form fuel gas rich in CO, separating hot fuel gas from the mixture at said point of contact, contacting the mixture of inert material and partially spent carbonaceous material at a later point in said cycle with a gasiform material capable of reacting exothermically with said carbonaceous material to form carbon dioxide and to thereby heat up said inert solids, said last-named gasiform material containing at least sufficient free oxygen to consume the residual carbon in the cycle at the point of contact and said first-named gasiform material comprising residual hot carbon dioxide-containing combustion gases resulting from said exothermic reaction, separating ash from said inert solids while in the hot condition resulting from said exothermic reaction and returning said hot inert solids to the first-named point.

8. A method according to claim 7 in which the hot product gas is passed in heat exchange relation to said second named gasiform material before the latter enters the cycle.

9. A method according to claim 7 in which ash is removed from the cycle by elutriation.

10. A method according to claim 7 in which after contact with the second gasiform material and before contact with the first gasiform material the cycle includes an enlarged zone in which the hot inert material and ash is blown with a hot inert gas to carry off ash from said inert material.

11. A method according to claim 7 in which the second named gasiform material contacts the cycled material in an enlarged zone through which the gasiform material passes upwardly and carries off some ash and said ash is returned, at least in part, to said enlarged zone.

12. A method according to claim 7 in which the second named gasiform material contains steam and at least sufficient free oxygen to consume the residual carbon in said cycle at the point of contact, the resulting hot combustion gases constitute the first named gasiform material and the hot product gas is passed in indirect heat exchange relation with said second named gasiform material before the latter enters the cycle.

13. A method for producing a fuel gas rich in CO from solid carbonaceous material which comprises reacting carbonaceous material with a gasiform material which reacts endothermically therewith in an endothermic reaction zone, reacting in a second zone, carbonaceous material and a gasiform material which reacts exothermically with said carbonaceous material, the gaseous material passed to said last-named zone being further characterized in that it contains steam and more than sufficient free oxygen to consume the carbon fed to that zone, and the gaseous material fed to said first-named zone being further characterized in that it comprises substantially hot off-gases comprising carbon dioxide, nitrogen and substantial amounts of oxygen from said last-named zone, passing a moving stream of finely divided inert solids of high heat capacity in a closed cycle including said zones whereby said inert solids move from one zone to the other in sequence, feeding finely divided fresh carbonaceous material to said first zone in which it mixes with said inert solids, feeding to said first zone, gasiform material which reacts endothermically with said carbonaceous material in a manner such as to maintain said carbonaceous material and said inert solids in said zone in a fluidized condition, feeding partially spent carbonaceous material and inert solids from said first zone to said second zone, feeding gasiform material capable of reacting exothermically with said partially spent carbonaceous material to said second zone in a manner such as to maintain the carbonaceous material and inert solids in said second zone in a fluidized condition in which said carbonaceous material is consumed by reaction with said gasiform material and converted into ash, separating ash from said inert solids while in the hot condition resulting from said exothermic reaction, and returing said hot inert solids to said first zone.

14. A method for producing fuel gas from solid carbonaceous material which comprises establishing a closed cycle of a moving body of finely divided inert solid material of high heat capacity, maintaining said solid in a turbulent suspended condition throughout its cycle, adding finely divided fresh carbonaceous material to said moving body at one point of its cycle, contacting the mixture with a gasiform material capable of reacting endothermically with said carbonaceous material at said point under conditions under which they react to form hot fuel gas rich in CO, separating hot product gas from the mixture at said point of contact, contacting the mixture of inert material and partially spent carbonaceous material at a later point in said cycle with a gasiform material containing steam and at least sufficient free oxygen to consume the residual carbon in said cycle at the point of contact in an exothermic reaction to thereby heat up said inert solids, separating ash from said hot inert solids, removing ash from said cycle, and returning said separated inert solids to said first-named point, the residual hot combustion gases resulting from said exothermic reaction comprising said first-named gasiform material.

WARREN K. LEWIS.

REFERENCES CITED

The following references are of record in the file of this patent:

UNITED STATES PATENTS

| Number | Name | Date |
| --- | --- | --- |
| 1,913,968 | Winkler | June 13, 1933 |
| 1,977,684 | Lucke | Oct. 23, 1934 |
| 2,362,270 | Hemminger | Nov. 7, 1944 |
| 2,414,883 | Martin | Jan. 28, 1947 |
| 2,436,938 | Scharmann et al. | Mar. 2, 1948 |
| 2,441,386 | Berg | May 11, 1948 |
| 2,482,187 | Johnson | Sept. 20, 1949 |
| 2,579,397 | Roetheli | Dec. 18, 1951 |
| 2,579,398 | Roetheli | Dec. 18, 1951 |

FOREIGN PATENTS

| Number | Country | Date |
| --- | --- | --- |
| 523,221 | Great Britain | July 9, 1940 |

OTHER REFERENCES

Abraham, "Asphalts and Allied Substances," 4th Edition pp. 778–779.